United States Patent
Singh et al.

(10) Patent No.: US 7,229,377 B2
(45) Date of Patent: Jun. 12, 2007

(54) LUBRICATION SYSTEM FOR A TRANSMISSION OUTPUT DIFFERENTIAL MECHANISM

(75) Inventors: Tejinder Singh, Canton, MI (US); Kent Johnson, Ypsilanti, MI (US)

(73) Assignee: General Motors Corporation, Detroit, MI (US)

( * ) Notice: Subject to any disclaimer, the term of this patent is extended or adjusted under 35 U.S.C. 154(b) by 87 days.

(21) Appl. No.: 11/152,017

(22) Filed: Jun. 14, 2005

(65) Prior Publication Data

US 2006/0089225 A1 Apr. 27, 2006

Related U.S. Application Data

(60) Provisional application No. 60/589,276, filed on Jul. 20, 2004.

(51) Int. Cl.
*F16H 57/04* (2006.01)

(52) U.S. Cl. ................................. 475/160

(58) Field of Classification Search ........... 475/160; 184/6–12

See application file for complete search history.

(56) References Cited

U.S. PATENT DOCUMENTS 6,718,847 B2 * 4/2004 Rimkus et al. ........... 74/606 R

* cited by examiner

*Primary Examiner*—Dirk Wright
(74) *Attorney, Agent, or Firm*—Christopher DeVries

(57) ABSTRACT

A differential lubrication system includes structure forming a torque converter feed passage in fluid communication with a fluid source and in which fluid is selectively supplied to a torque converter. Structure forming a branch passage for lubricating a differential mechanism extends from the torque converter feed passage to divert fluid to the differential mechanism prior to the fluid being supplied to the torque converter. Two flow restrictions and a valve mechanism may be employed to control lubrication of the differential mechanism. One of the flow restrictions may form a nozzle so that fluid is sprayed onto the differential mechanism. A method of lubricating the differential mechanism is also provided.

19 Claims, 1 Drawing Sheet

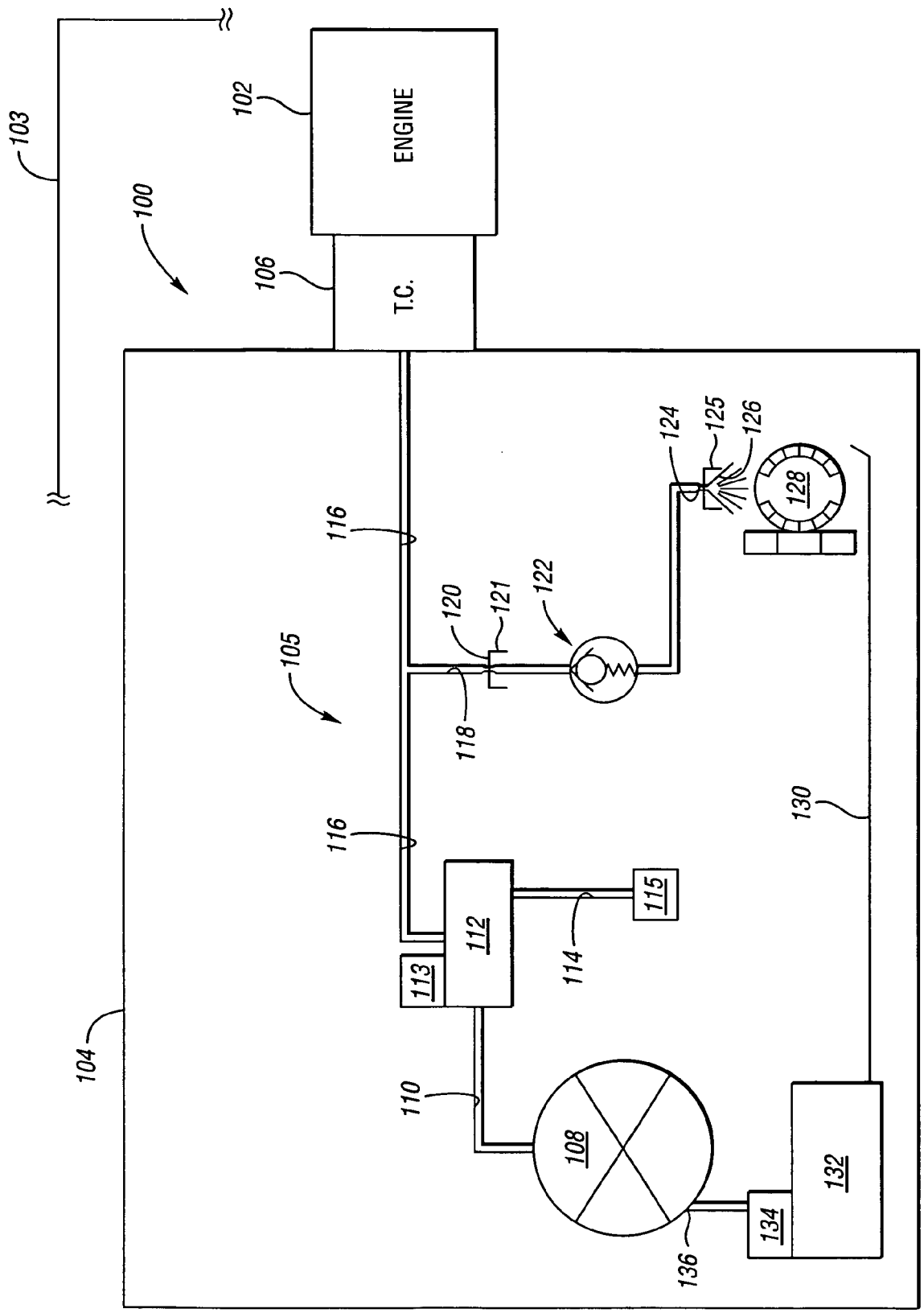

LUBRICATION SYSTEM FOR A TRANSMISSION OUTPUT DIFFERENTIAL MECHANISM

CROSS-REFERENCE TO RELATED APPLICATIONS

This application claims the benefit of U.S. Provisional Application No. 60/589,276, filed Jul. 20, 2004, which is hereby incorporated by reference in its entirety.

TECHNICAL FIELD

This invention relates to transmission lubrication and, more particularly, to transmission lubrication of differential mechanisms in powertrains.

BACKGROUND OF THE INVENTION

A typical powertrain for a vehicle transmission includes an output differential, which requires some lubrication. This lubrication is generally provided by splashing oil from the transmission case or by supplying lubrication fluid from the general lube circuit after the fluid has passed through a torque converter where the fluid gets heated due to converter heat generation and then through a cooler (part of the vehicle radiator) where the fluid is cooled and then supplied to various lubrication passages throughout the transmission.

SUMMARY OF THE INVENTION

An improved lubrication system is provided for the differential mechanism of a powertrain having a transmission, a torque converter and a fluid source, such as a sump and pump. By providing fluid to the differential mechanism before the fluid is routed to a torque converter, different packaging options for the lubrication system and the differential mechanism are available. Additionally, efficient cooling with potentially lower temperature fluid is provided to the differential mechanism. The differential mechanism is directly targeted by cooling fluid, preferably in the form of a spray.

A lubrication system for a differential mechanism for a powertrain includes structure forming a torque converter feed passage that is in fluid communication with the fluid source and the torque converter to deliver fluid from the fluid source to the torque converter. The lubrication system also includes structure forming a branch passage extending form the torque converter feed passage between the fluid source and the torque converter and in fluid communication with the differential mechanism. The branch passage diverts fluid provided by the fluid source from the torque converter feed passage for cooling of the differential mechanism.

In one aspect of the invention, a pressure regulating mechanism is in fluid communication between the fluid source and the torque converter feed passage. The pressure regulating mechanism, such as a pressure regulator valve, is controllable by a controller, such as a transmission control unit, for selectively distributing fluid supplied by the fluid source to the torque converter feed passage.

In another aspect of the invention, the lubrication system includes structure forming a first passage to fluidly communicate between the fluid source and the pressure regulating mechanism. Structure forming a second passage fluidly communicates between the pressure regulating mechanism and a torque transmitting mechanism within the transmission. The pressure regulating mechanism is controllable to selectively distribute fluid supplied by the fluid source from the first passage to the second passage to establish at least a predetermined level of pressure in the second passage for controlling the torque transmitting mechanism. The pressure regulating mechanism is also controllable to selectively distribute fluid supplied by the fluid source to the torque converter feed passage after the predetermined level of pressure is established in the second passage. Thus, the torque converter is supplied with cooling fluid only after the pressure needs of the torque transmitting mechanism are satisfied.

In yet another aspect of the invention, the branch passage is formed with a flow restricting orifice that lowers fluid pressure therein. The flow restricting orifice may be provided within a plug positioned within the branch passage.

In still another aspect of the invention, a valve, such as a ball check valve, is positioned in the branch passage to selectively permit flow to the differential mechanism when a predetermined level of fluid pressure is achieved in the branch passage. By preventing flow when the predetermined level of fluid pressure is not present, the valve prevents undesirable draining of the torque converter when the transmission is not operational.

In another aspect of the invention, structure forming a return flow path is in fluid communication with the differential mechanism and with the fluid source so that fluid directed through the branch passage for cooling of the differential mechanism is returned to the fluid source via the return flow path.

The invention provides a vehicle powertrain that includes an engine, a transmission and a torque converter transmitting power between the engine and the transmission. The transmission includes a differential mechanism, a fluid source, and the torque converter feed passage and branch passage described above.

The invention also provides a method of lubricating a transmission differential. The method includes directing fluid from a fluid source to a torque converter for cooling the torque converter. The method further includes diverting some of the fluid directed from the fluid source to the torque converter to the differential mechanism upstream of the torque converter so that the differential mechanism is cooled with fluid that has not passed through the torque converter since being directed form the fluid source.

In one aspect of the invention, the method includes directing fluid from the fluid source to a transmission component (such as a torque-transmitting mechanism) and controlling flow to the torque converter so that fluid is directed to the torque converter only after fluid directed to the transmission component is characterized by at least a predetermined level of pressure.

In yet another aspect of the invention, the fluid directed to the differential mechanism is characterized by a first pressure level. The method further includes restricting flow of the fluid directed to the differential mechanism so that the fluid is characterized by a second pressure level less than the first pressure level.

In still another aspect of the invention, the method includes preventing flow of the fluid directed to the differential mechanism when the fluid is characterized by a pressure below a predetermined pressure level. The preventing step may be accomplished, for instance, by a ball check valve located within the branch passage.

The above features and advantages and other features and advantages of the present invention are readily apparent from the following detailed description of the best mode for carrying out the invention when taken in connection with the accompanying drawings.

BRIEF DESCRIPTION OF THE DRAWING

A schematic cross-sectional illustration of a differential lubrication system employed within a vehicle powertrain is shown.

DESCRIPTION OF THE PREFERRED EMBODIMENT

As seen in the drawing, a powertrain 100 for a vehicle 103 has a conventional engine 102, a transmission 104, and a torque converter 106, which as is well known provides power flow from the engine 102 to the transmission 104 in a hydrodynamic manner. The torque converter 106 differs from other fluid couplings in that it multiplies torque transmission. The torque and duty cycle loading requirements inside the torque converter 106 generate heat, requiring circulation of fluid through the torque converter 106 past a radiator or other heat dump (not shown) prior to redirecting the cooled fluid to the torque converter 106.

The transmission 104 includes a differential lubrication system 105 that includes a transmission pump 108. The transmission pump 108 supplies fluid (which may be referred to as oil) for cooling or lubrication through a first passage 110 to a pressure regulator mechanism 112. The pressure regulator mechanism 112 is preferably a hydrodynamic spool valve that selectively supplies line pressure in a second passage 114 that provides for operation of various torque-transmitting mechanisms 115 within the transmission. Accordingly, the pressure regulator mechanism 112 may be referred to as a valve 112. The valve 112 may also supply oil from the first passage 110 to a converter feed passage 116. A controller 113 controls the positioning of the valve 112 to regulate flow through passages 110, 114, 116. The controller 113 may be a control unit dedicated to the transmission 104 or may also regulate other vehicle components, such as the engine 102. Preferably, the valve 112 is controlled to supply oil to the torque converter 106 only after a predetermined level of pressure in the second passage 114 is satisfied.

A third passage 118, which may be referred to as a branch passage, extends from the converter feed passage 116 upstream of the torque converter 106 (i.e., prior to the oil supplied by the pump 108 being served at the torque converter 106). The branch passage 118 allows fluid communication from the pump 108 to a differential mechanism 128. The differential mechanism 128 is housed within the transmission 104 (i.e., within a transmission casing) as is typical for front-wheel drive and transversely mounted transmissions. The branch passage 118 has an optional first restriction 120, an optional spring-biased ball check valve 122, and an optional second restriction 124. The positions of the restriction 120 and the check valve 122 are interchangeable. The first and second restrictions 120, 124 are orifices that enable relatively low volume fluid flow by creating a pressure drop. By restricting flow, pressure of fluid downstream of each orifice is less than that prior to flowing through the orifice (e.g., a first pressure level exists in the branch passage 118 upstream of the restriction 120 and a second lower pressure level exists in the branch passage 118 downstream of the restriction 120). The branch passage 118 may be formed such that the second restriction is a nozzle (i.e., the branch passage 118 flares wider after an initial restriction). The nozzle shape acts as a sprayer and is designated at 126. The restrictions 120, 124 may be orifices formed within plugs 121, 125, respectively, placed within the branch passage 118.

The check valve 122 is calibrated to prevent flow downstream thereof when a predetermined (first) level of pressure is not achieved in the portion of the branch passage 118 between the first restriction 120 and the check valve 122. This helps maintain adequate pressure in the converter feed passage 116, thereby preventing unwanted draining of the torque converter 106 when the transmission 104 is not operational. Together, the pressure regulator valve 112, the restrictions 120, 124 and the check valve 122 cooperate to present an optimal amount of fluid for lubricating and cooling the differential mechanism 128. Those skilled in the art will readily recognize the functions of the differential mechanism to direct power to vehicle wheels (not shown), to potentially act as a final gear reduction and to transmit power to the wheels while allowing them to rotate at differing speeds. The sprayer 126 directs fluid from the branch passage 118 onto the differential mechanism 128. Because the fluid in the branch passage 118 is diverted from the torque converter feed passage 116 upstream of the torque converter 106, it has not been heated by the operation of the torque converter 106 and therefore does need cooling prior to being dispensed on the differential mechanism 128. This permits the differential mechanism 128 to be not only directly lubricated, but lubricated with fluid that is not at an elevated temperature, both of which enable efficient cooling of the differential mechanism 128. The lubrication fluid that is sprayed on the differential mechanism 128 then travels by gravity along a flow path 130 into a transmission sump 132 where it mixes with fluid collected from other parts of the transmission (e.g., the fluid used to cool the torque converter 106) and is directed through a filter 134 back to an inlet 136 of the pump 108. The sump 132 and pump 108 establish a fluid source for lubrication of the transmission differential mechanism 128 and the torque converter 106.

Accordingly, with reference to the structure shown in the drawing, a method of lubricating the differential mechanism 128 includes directing fluid from the fluid source (i.e., the pump 108 and sump 132 with optional filter 134) to the torque converter 106 for cooling the torque converter 106. The method also includes diverting some of the directed fluid to the differential mechanism 128 upstream of the torque converter 106 such that the differential mechanism 128 is cooled with fluid that has not passed through the torque converter 106 since being directed from the pump 108 and sump 132. The method may also include directing fluid from the fluid source 108, 132 to a transmission component such as the torque-transmitting mechanism 115 and controlling flow to the torque converter 106 so that fluid is directed to the torque converter 106 only after fluid directed to the torque-transmitting mechanism 115 has a predetermined (desired) level of pressure.

The method may also include restricting flow of the fluid directed to the differential mechanism 128 so that it has a second pressure level that is less than a first pressure level existing above a restriction such as the first restriction 120 or the second restriction 124. The method may also include preventing flow of the fluid directed to the differential mechanism 128 when the fluid does not have at least a predetermined pressure level. This is accomplished by the ball check valve 122 in the embodiment shown in the drawing. The method may also include spraying the diverted fluid onto the differential mechanism 128 to cool the differential mechanism 128.

While the best mode for carrying out the invention has been described in detail, those familiar with the art to which this invention relates will recognize various alternative designs and embodiments for practicing the invention within the scope of the appended claims.

The invention claimed is:

1. A lubrication system for a differential mechanism of a power train having a transmission, a torque converter and a fluid source, the lubrication system comprising:
   structure forming a torque converter feed passage in fluid communication with the fluid source and with the torque converter and operable for delivering fluid provided by the fluid source to the torque converter; and
   structure forming a branch passage extending from said torque converter feed passage between the fluid source and the torque converter and in fluid communication with the differential mechanism, said branch passage diverting fluid provided by the fluid source from said torque converter feed passage for cooling of the differential mechanism.

2. The lubrication system of claim 1, further comprising:
   a pressure regulating mechanism in fluid communication between the fluid source and said torque converter feed passage and controllable for selectively distributing fluid supplied by the fluid source to said torque converter feed passage.

3. The lubrication system of claim 2, wherein the transmission includes a hydraulic torque-transmitting mechanism, the lubrication system further comprising:
   structure forming a first passage in fluid communication with the fluid source and said pressure regulating mechanism; and
   structure forming a second passage in fluid communication with said pressure regulating mechanism and the torque-transmitting mechanism;
   wherein said pressure regulating mechanism is controllable to selectively distribute fluid supplied by the fluid source from said first passage to said second passage to establish at least a predetermined level of pressure therein for controlling the torque-transmitting mechanism, and to said torque converter feed passage after said predetermined level of pressure is established in said second passage.

4. The lubrication system of claim 1, wherein said branch passage is formed with at least one flow-restricting orifice operable for lowering fluid pressure within said branch passage.

5. The lubrication system of claim 1, further comprising:
   at least one plug having a flow-restricting orifice, said at least one plug being positioned within said branch passage and operable for lowering fluid pressure therein.

6. The lubrication system of claim 1, further comprising:
   a valve positioned within said branch passage and operable to selectively permit fluid flow past said valve when a predetermined level of fluid pressure is achieved within said branch passage, said valve thereby preventing draining of the torque converter through the branch passage when the transmission is not operational.

7. The lubrication system of claim 1, further comprising:
   structure forming a return flow path in fluid communication with the differential mechanism and with the fluid source; and wherein fluid directed through said branch passage for cooling of the differential mechanism is returned to the fluid source via said return flow path.

8. A vehicle powertrain comprising:
   an engine;
   a transmission;
   a torque converter transmitting power between said engine and said transmission;
   wherein said transmission includes:
      a differential mechanism;
      a fluid source;
      structure forming a torque converter feed passage in fluid communication between said fluid source and said torque converter; and
      structure forming a branch passage in fluid communication between said torque converter feed passage and said differential and operable for diverting fluid from said torque converter feed passage for cooling of said differential mechanism.

9. The vehicle powertrain of claim 8, further comprising:
   a control unit; and
   a pressure regulating mechanism in fluid communication between said fluid source and said torque converter feed passage and controllable by said control unit for selectively distributing fluid supplied by said fluid source to said torque converter feed passage.

10. The vehicle powertrain of claim 9, wherein said transmission further includes:
   a hydraulic torque-transmitting mechanism;
   structure forming a first passage in fluid communication with said fluid source and said pressure regulating mechanism; and
   structure forming a second passage in fluid communication with said pressure regulating mechanism and said torque-transmitting mechanism;
   wherein said pressure regulating mechanism is controllable to selectively distribute fluid supplied by said fluid source from said first passage to said second passage to establish at least a predetermined level of pressure therein for controlling said torque-transmitting mechanism, and to said torque converter feed passage after said predetermined level of pressure is established in said second passage.

11. The vehicle powertrain of claim 8, wherein said branch passage is formed with at least one flow restricting orifice operable for lowering fluid pressure within said branch passage.

12. The vehicle powertrain of claim 8, further comprising:
   at least one plug having a flow-restricting orifice, said at least one plug being positioned within said branch passage and operable for lowering fluid pressure therein.

13. The powertrain of claim 8, further comprising:
   a valve positioned within said branch passage and operable to selectively permit fluid flow past said valve when a predetermined level of fluid pressure is achieved within said branch passage, said valve thereby preventing draining of the torque converter through the branch passage when the transmission is not operational.

14. The vehicle powertrain of claim 8, further comprising:
   structure forming a return flow path in fluid communication with said differential mechanism and with said fluid source; and wherein fluid directed through said branch passage for cooling of said differential mechanism is returned to said fluid source via said return flow path.

15. A method of lubricating a transmission differential mechanism, the method comprising:

directing fluid from a fluid source to a torque converter for cooling of the torque converter; and diverting some of the directed fluid to the differential mechanism upstream of the torque converter such that the differential mechanism is cooled with fluid that has not passed through the torque converter since being directed from the fluid source.

16. The method of claim 15, further comprising:

directing fluid from the fluid source to a transmission component; and controlling flow to the torque converter such that fluid is directed to the torque converter only after fluid directed to the transmission component is characterized by at least a predetermined level of pressure.

17. The method of claim 15, wherein the fluid directed to the differential mechanism is characterized by a first pressure level, and the method further comprising:

restricting flow of the fluid directed to the differential mechanism such that the fluid is characterized by a second pressure level less than the first pressure level.

18. The method of claim 15, further comprising:

preventing flow of the fluid directed to the differential mechanism when the fluid is characterized by a pressure below a predetermined pressure level, thereby preventing draining of the torque converter when the transmission is not operational.

19. The method of claim 15, further comprising:

spraying the diverted fluid onto the differential mechanism for cooling thereof.

* * * * *